United States Patent
Kim et al.

(10) Patent No.: US 11,829,666 B2
(45) Date of Patent: Nov. 28, 2023

(54) PROCESSING CONSTRAINED PRINT OPTION FUNCTION

(71) Applicant: HEWLETT-PACKARD DEVELOPMENT COMPANY, L.P., Spring, TX (US)

(72) Inventors: Jeonghun Kim, Seongnam-si (KR); Hyeonin Jeong, Seongnam-si (KR); Ari Kim, Seongnam-si (KR); Mikyung Choi, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/912,959

(22) PCT Filed: Nov. 13, 2020

(86) PCT No.: PCT/US2020/060367
§ 371 (c)(1),
(2) Date: Sep. 20, 2022

(87) PCT Pub. No.: WO2021/252009
PCT Pub. Date: Dec. 16, 2021

(65) Prior Publication Data
US 2023/0161528 A1 May 25, 2023

(30) Foreign Application Priority Data
Jun. 11, 2020 (KR) .......................... 10-2020-0071022

(51) Int. Cl.
*G06F 3/12* (2006.01)
*G06F 3/04855* (2022.01)

(52) U.S. Cl.
CPC ........ *G06F 3/1255* (2013.01); *G06F 3/04855* (2013.01); *G06F 3/1204* (2013.01); *G06F 3/1254* (2013.01)

(58) Field of Classification Search
None
See application file for complete search history.

(56) References Cited

U.S. PATENT DOCUMENTS

| 8,422,044 B2 | 4/2013 | Miyashita |
| 2004/0051891 A1 | 3/2004 | Moro et al. |

(Continued)

FOREIGN PATENT DOCUMENTS

| JP | 2008-152668 A | 7/2008 |
| JP | 2009-175554 A | 8/2009 |

(Continued)

*Primary Examiner* — Frantz Bataille
(74) *Attorney, Agent, or Firm* — Brooks, Cameron & Huebsch, PLLC

(57) ABSTRACT

An example host device includes a user interface unit, a memory to store one or more instructions, and a processor. The processor controls to display a print option setting screen on a user interface unit, the print option setting screen including a second user interface area for setting a second print option function constrained according to a setting of a first print option function, and controls to display a first user interface element and a second user interface element in the second user interface area, the first print option function corresponding to an operation of displaying a first user interface area for setting a first user print option function and the second user interface element corresponding to an operation of changing the setting of the first print option function to a preset value.

15 Claims, 12 Drawing Sheets

(56) References Cited

U.S. PATENT DOCUMENTS

| | | | |
|---|---|---|---|
| 2004/0060010 A1 | 3/2004 | Bright et al. | |
| 2009/0190153 A1 | 7/2009 | Nakanishi | |
| 2011/0249279 A1* | 10/2011 | Lee | G06F 3/1208 358/1.13 |
| 2012/0147399 A1* | 6/2012 | Uotani | G06F 3/1245 358/1.9 |
| 2016/0085490 A1 | 3/2016 | Sugiyama | |
| 2016/0210036 A1 | 7/2016 | Treitman et al. | |

FOREIGN PATENT DOCUMENTS

| | | |
|---|---|---|
| JP | 2009-176086 A | 8/2009 |
| JP | 2010-244317 A | 10/2010 |
| JP | 2011-022679 A | 2/2011 |

\* cited by examiner

PROCESSING CONSTRAINED PRINT OPTION FUNCTION

BACKGROUND

An image forming apparatus such as a printer, a copier, a scanner, a facsimile, a multifunction printer, and the like provides various print option functions. A user may set a print option function on a print option setting screen provided by a printer driver to print out a printed material in the user-desired form. For example, the print option function may include a size of a print medium, a printing range, a number of copies, a printing direction, a page layout, a printing style, a paper feeding tray, and the like.

DETAILED DESCRIPTION

Figure 1:
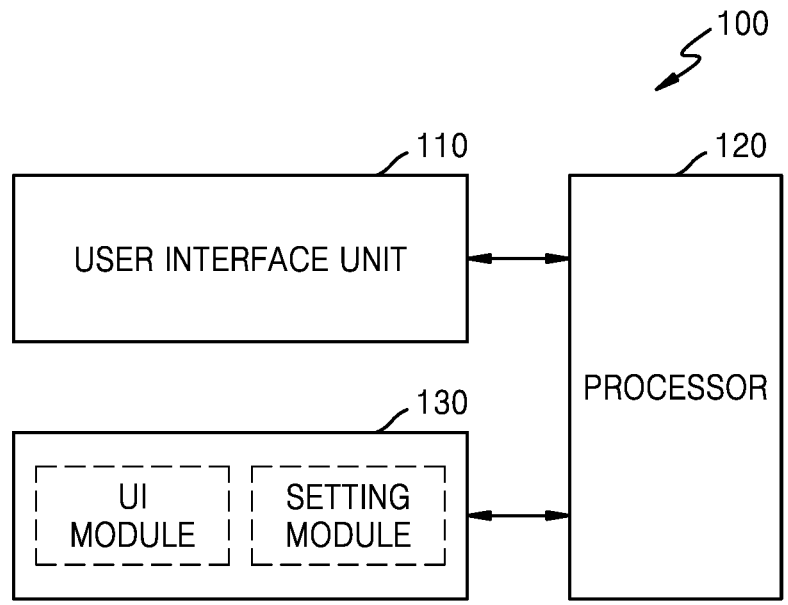
FIG. 1 is a diagram illustrating a host device according to an example.

An arbitrary print option function that may be set on a print option setting screen may be in a constraint relationship with another print option function. That is, due to the arbitrary print option function's operating characteristics, in which the arbitrary print option function is partially incompatible with the other option function or is not interoperable with the other print option function, the setting of the other print option function may be constrained as the arbitrary print option function is set. For example, when a first print option function is set to a certain setting value on a print option setting screen, the use of a second print option function may be constrained, a setting value among selectable setting values of the second print option function may be constrained, or the second print option function may be set to a particular setting value. Here, the second print option function is a print option function constrained according to the setting of the first print option function, and the first print option function is a print option function that causes the constraint of the second print option function, which is the constrained print option function. In the present disclosure, "the constrained print option function" refers to a print option function which is constrained in use or of which a setting value is constrained in use, or which is set to a particular value as the arbitrary print option function is set.

When a print option function that a user desires to set on the print option setting screen is a constrained print option function, the user may find a print option function, which causes the constraint of the constrained print option function, and change a setting value thereof or change the setting value thereof to a preset value, such that the user may release the constraint of the constrained print option function and set a user-desired setting value for the print option function. To this end, it is necessary for the user to know a constraint relationship between the print option functions and a position of each of the print option functions on the print option setting screen, and thus the user who desires to set the print option functions may be inconvenienced. Hereinafter, an example of an intuitive user interface of a print option setting screen provided by a printer driver so as to allow the user to conveniently and easily process the constrained print option function will be described. Elements having substantially the same functional configuration in the present specification and drawings are denoted by the same reference numerals, and redundant descriptions thereof are not provided.

Examples of the present disclosure relate to an electronic device capable of providing a print option setting screen, and may, for example, relate to a host device or an image forming apparatus through which a user may set a print option function on the print option setting screen. Hereinafter, for convenience of description, examples of the present disclosure will be described based on the host device. However, as will be described below, an image forming apparatus is a device capable of performing the examples of the present disclosure.

FIG. 1 is a diagram illustrating a host device according to an example.

Referring to FIG. 1, a host device 100 may include a user interface unit 110, a processor 120, and a memory 130. The terms "unit," "module," and the like, which are described in the present specification, refer to a unit for processing a function or operation which may be implemented by hardware, software, or a combination of the two. In addition, terms including an ordinal number such as a first or a second may be used to describe various elements. However, it is understood that the terms are simply used to distinguish one component from another component unless otherwise indicated that the terms refer to a sequence.

The user interface unit 110 may include an input unit to receive a user input, such as an input for performing an image forming job or an input for setting a print option from a user. The user interface unit 110 may also include an output unit to display information such as a performance result of the image forming job, a state of the image forming apparatus, and the like. For example, the user interface unit 110 may be a combination of a light emitting diode (LED) display device, a liquid crystal display (LCD) device, and the like with a keyboard or a mouse, or may be in the form of a touch screen. However, examples are not limited thereto.

The processor 120 may control an operation or a function performed by the host device 100 by executing an instruction stored in the memory 130. The processor 120 may include a processing module. For example, the processor 120 may include a central processing unit, a microprocessor, a graphics processing unit, an application specific integrated circuit (ASIC), a digital signal processor (DSP), a field programmable gate array (FPGA), and the like. The processor 120 may control other components included in the host device 100 so that the other components may perform an operation corresponding to a user input received through the user interface unit 110. The processor 120 may execute instructions, a software module, or a program stored in the memory 130, read data or a file stored in the memory 130, or store a new program or a new application in the memory 130.

The memory 130 may store an instruction. The processor 120 may correspond to an example of a computer capable of executing the instruction stored in the memory 130. The memory 130 may store the instruction, the software module, or the program. The memory 130 may include at least one of a random access memory (RAM), a static random access memory (SRAM), a read-only memory (ROM), a flash memory, an electrically erasable programmable read-only memory (EEPROM), a programmable read-only memory (PROM), a magnetic memory, a magnetic disk, an optical disk, and the like.

The memory 130 may store a user interface (UI) module and a setting module. The UI module and the setting module may be software modules or programs that include an instruction, and may correspond to another program.

The UI module may include a UI input/output module and a UI configuration module. The UI input/output module may identify a user input to a print option setting screen displayed on the user interface unit 110 and identify an output of the print option setting screen that is generated or changed by the UI configuration module. The UI configuration module may generate or change, according to information received from the setting module, a print option setting screen to be displayed on the user interface unit 110.

The setting module may include a print option setting confirmation module and a constraint confirmation module. The print option setting confirmation module may receive a user input to the print option setting screen from the UI input/output module and transmit output information corresponding to the user input to the UI configuration module. The print option setting confirmation module may request the constraint confirmation module to confirm whether there is a print option function constrained by the setting according to a user input to an arbitrary print option function. The constraint confirmation module may confirm whether there is a print option function constrained according to the setting of the arbitrary print option function based on a list of print option functions in the constraint relationship, and transmit a confirmation result to the print option setting confirmation module. The print option setting confirmation module may match and store the print option functions in the constraint relationship based on the confirmation result confirmed by the constraint confirmation module. The print option setting confirmation module may transmit information about the print option functions in the constraint relationship to the UI configuration module. The UI configuration module may generate or change the print option setting screen to be displayed on the user interface unit 110 based on the information about the print option functions in the constraint relationship.

The processor 120 may load the UI module and the print option module from the memory 130, and execute the corresponding instructions. According to an example, the host device 100 may configure a user interface of a print option setting screen so that a user may easily recognize a second print option function constrained according to the setting of the first print option function on the print option setting screen. The host device 100 may configure the user interface of a print option setting screen and display the user interface on the user interface unit 110 so that the user may conveniently and easily process the constrained second print option function.

For example, the processor 120 may control, by executing an instruction stored in the memory 130, a print option setting screen to be displayed on the user interface unit 110. In an example, the print option setting screen may include a second user interface area for setting the second print option function, which is a print option function constrained according to the setting of the first print option function. The processor 120 may control a first user interface element and a second user interface element to be displayed in the second user interface area, the first user interface element corresponding to an operation of displaying a first user interface area for setting the first print option function and the second user interface element corresponding to an operation of changing the setting of the first print option function to a preset value. The first user interface element may be an image with a link, or a link image with a link such as a hyperlink that provides a connection from one area to another area of the screen. The second user interface element may be a button image, such as a virtual button that causes a certain operation to be executable. Hereinafter, for convenience of description, an example is described in which the first user interface element is a link image, and the second user interface element is a button image. The link image and the button image may be displayed in the second user interface area of the print option setting screen in response to a user interface element displayed in the user interface area, for example, a user input to a preset icon image. The link image may be displayed such that a name of the first print option function, which is a print option function that causes the constraint of the second print option function, appears. When there are a plurality of print option functions that cause the constraint of the second print option function, the processor 120 may display a print option setting screen that provides the link image and the button image corresponding to each of the plurality of print option functions in the second user interface area through the user interface unit 110. For example, when a setting of a third print option function constrains the second print option function, the processor 120 may control a third user interface element and a fourth user interface element to be additionally displayed in the second user interface area, the third user interface element corresponding to an operation of displaying a third user interface area for setting the third print option function and the fourth user interface element corresponding to an operation of changing the setting of the third print option function to a preset value.

In addition, the print option setting screen may further include a scroll bar including indicators indicating positions of the first user interface area and the second user interface area on the print option setting screen. In this case, the processor 120 may change the print option setting screen so that a user interface area for setting a print option function corresponding to an arbitrary indicator may be displayed, in response to a user input to the arbitrary indicator of the scroll bar.

Moreover, the processor 120 may change the print option setting screen so that the first user interface area is to be displayed in response to a user input to a link image corresponding to an operation of displaying the first user interface area. The processor 120 may change the first print option function to a different value in response to a user input to the first user interface area on the changed print option setting screen so that the constraint of the second print option function may be released. Alternatively, the processor 120 may change the setting of the first print option function to a preset value in response to a user input to a button image corresponding to an operation of changing the setting of the first print option function to a preset value, and thus may release the constraint of the second print option function.

Hereinafter, various examples of a user interface of a print option setting screen enabling a user to easily recognize and conveniently process a constrained second print option function will be described with reference to drawings.

Figure 2:
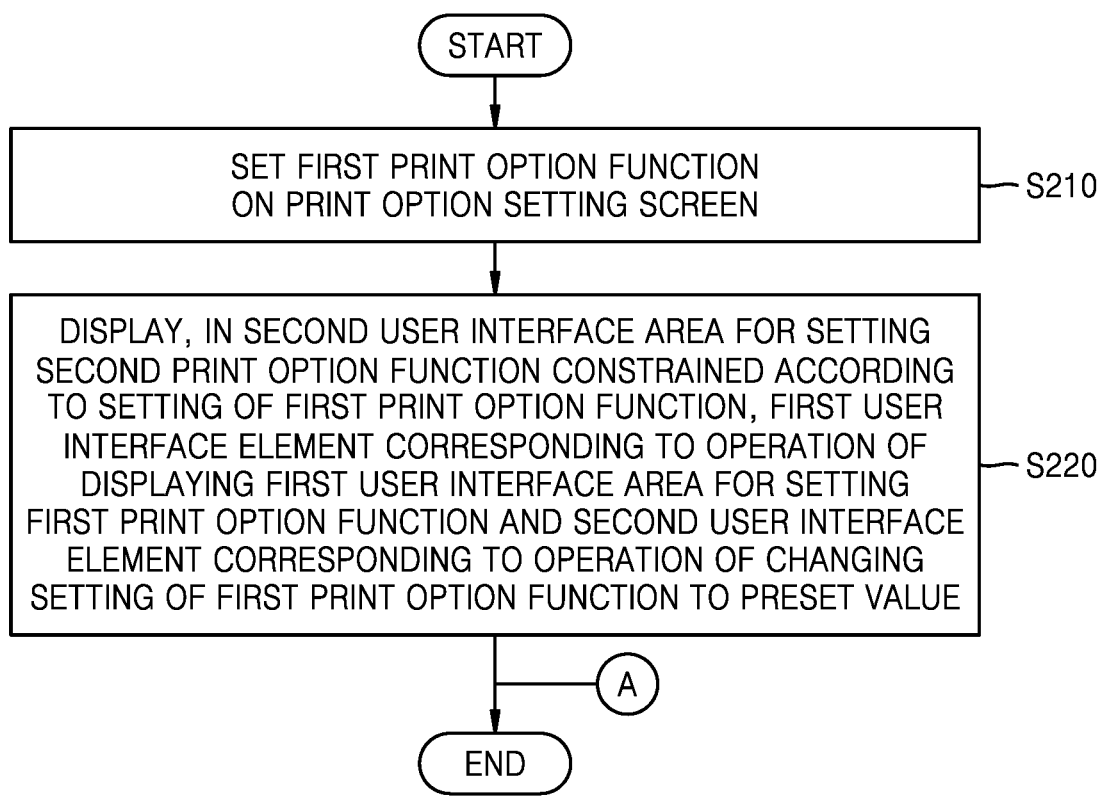
FIG. 2 is a flowchart illustrating a process of displaying a print option setting screen including a constrained print option function in a method of processing a constrained print option function according to an example.

FIG. 2 is a flowchart illustrating a process of displaying a print option setting screen including a constrained print option function in a method of processing a constrained print option function according to an example.

Referring to FIG. 2, the host device 100 may set the first print option function on the print option setting screen in operation S210. The host device 100 may display the print option setting screen through the user interface unit 110 and receive a user input to the first print option function from the user. For example, the host device 100 may receive a user input which selects a selectable setting value of the first print option function from the user. According to the setting of the first print option function, the print option setting screen which provides the first user interface area may be changed. In addition, the second print option function, which is in the constraint relationship with the first print option function, may be constrained in such a way that the print option function itself is constrained in use, a setting value is constrained in use, or the second print option function is set to a particular setting value. Accordingly, the print option setting screen which provides the second user interface area may be changed. There may be a plurality of second print option functions which are in the constraint relationship with the first print option function.

The host device 100 may display, in the second user interface area for setting the second print option function, which is a print option function constrained according to the setting of the first print option function, a link image corresponding to an operation of displaying a first user interface area for setting the first print option function and a button image corresponding to an operation of changing the setting of the first print option function to a preset value in operation S220. The link image and the button image are displayed in the second user interface area of the print option setting screen in response to a user interface element displayed in the second user interface area, for example, a user input to a preset icon image. The link image may be displayed so that the name of the first print option function, which is a print option function that causes the constraint of the second print option function, may appear. The host device 100 may display, when there are a plurality of print option functions that cause the constraint of the second print option function, a link image and a button image corresponding to the plurality of print option functions in the second user interface area, respectively. For example, the host device 100 may additionally display in the second user interface area, when the setting of the third print option function constrains the second print option function, the third user interface element corresponding to an operation of displaying a third user interface area for setting the third print option function and the fourth user interface element corresponding to an operation of changing the setting of the third print option function to a preset value.

Figure 3:
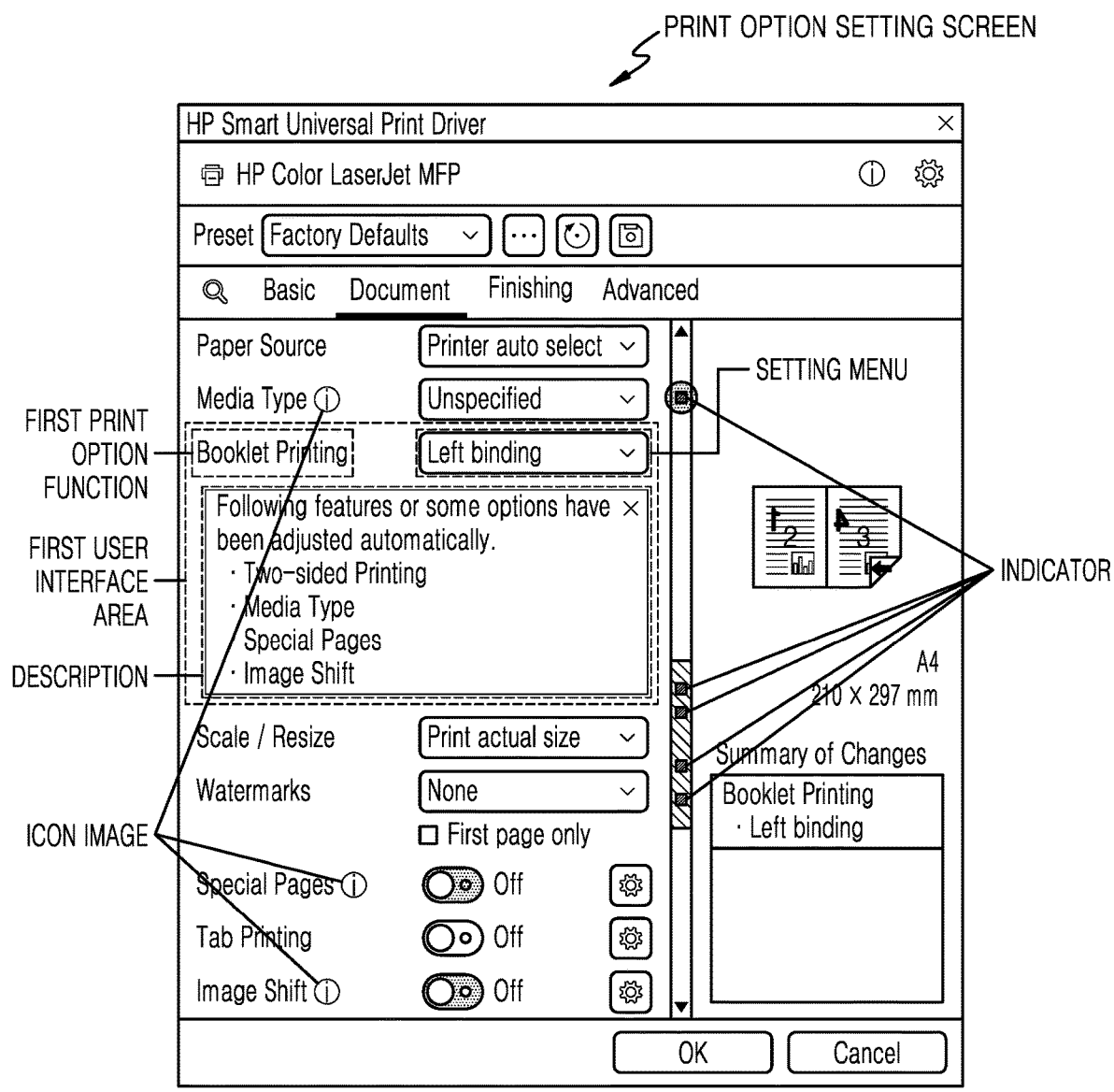
FIG. 3 is a diagram illustrating a change in a print option setting screen that provides a first user interface area for setting a first print option function according to the setting of the first print option function according to an example.

FIG. 3 is a diagram illustrating a change in a print option setting screen that provides a first user interface area for setting a first print option function according to the setting of the first print option function according to an example.

Referring to FIG. 3, a change in a print option setting screen according to a user input which selects a particular setting value in a setting menu of the user interface area for setting the 'Booklet Printing' is illustrated. The setting values selectable for 'Booklet Printing' may include 'Off', 'Left binding', and 'Right binding', which are preset values. In the example of FIG. 3, a change in the print option setting screen according to a user input which selects 'Left binding' as a setting value among 'Off', 'Left binding', and 'Right binding' is illustrated. The first print option function is not limited to the print option function, which is 'Booklet Printing', and the illustrated setting values are not limited thereto.

As shown in FIG. 3, the user interface area for setting 'Booklet Printing' may provide a description of second print option functions that may be constrained according to a user selection of 'Left binding'. The description may include a name of a second print option function which itself is constrained in use or a setting value of which is constrained, and may be adaptively changed according to a setting value set by the user. In the example of FIG. 3, it is illustrated that as 'Left binding' is set as a setting value for 'Booklet Printing', print option functions including 'Two-sided Printing', 'Media Type', 'Special Page' and 'Image Shift' are automatically constrained. A user may make the description disappear by pressing a close button at an upper right end of a description area.

The print option setting screen may provide an icon image in each user interface area for setting the second print option functions such as 'Two-sided Printing', 'Media Type', 'Special Page', and 'Image Shift', which are constrained according to the setting of 'Booklet Printing'. The icon image indicates that there is information to be provided in relation to the constrained second print option function. In the example of FIG. 3, icon images are provided in each user interface area for setting 'Media Type', 'Special Page', and 'Image Shift' shown in the current print option setting screen.

In addition, the print option setting screen may further include a scroll bar including indicators indicating positions of the first user interface area and the second user interface area on the print option setting screen. A shape or a color of the indicators may be pre-designated by the user. A user may estimate an approximate position of a print option function using indicators of the scroll bar to move to a position of the corresponding print option function on the print option setting screen so that the print option setting screen may provide a user interface area that sets a preset print option function. The host device 100 may change a print option setting screen so that a user interface area for setting a print option function corresponding to an arbitrary indicator is to be displayed, in response to a user input to the arbitrary indicator of the scroll bar.

Referring to FIG. 3, an example is illustrated in which five indicators are displayed on a scroll bar provided on the print option setting screen. Each of the five indicators may correspond to 'Booklet Printing', which is the first print option function, and 'Two-sided Printing', 'Media Type', 'Special Page', and 'Image Shift', which are the second print option functions. The user may find a position of a user interface area for setting a user-desired print option function based on positions of the user interface areas of the print option functions provided on the current print option setting screen and positions of the indicators displayed on the scroll bar. According to an example shown in FIG. 3, a user interface area of a total of four print options in the constraint relationship from 'Booklet Printing', which is the first print option function, to 'Media Type', 'Special Page', and 'Image Shift', which are second print option functions constrained by the first print option function, may be provided on the currently displayed print option setting screen. An area of the print option setting screen currently displayed in all the areas of the print option setting screen corresponds to an area of the current scroll box in the entire area of the scroll bar, and four indicators are displayed in the area of the current scroll box. Accordingly, it is noticeable by the user that a first indicator displayed at the top of the scroll bar corresponds to 'Two-sided Printing'. The user may move to the user interface area for setting 'Two-sided Printing' by selecting the first indicator displayed at the top of the scroll bar or moving the scroll box to the top of the scroll bar.

Figure 4:
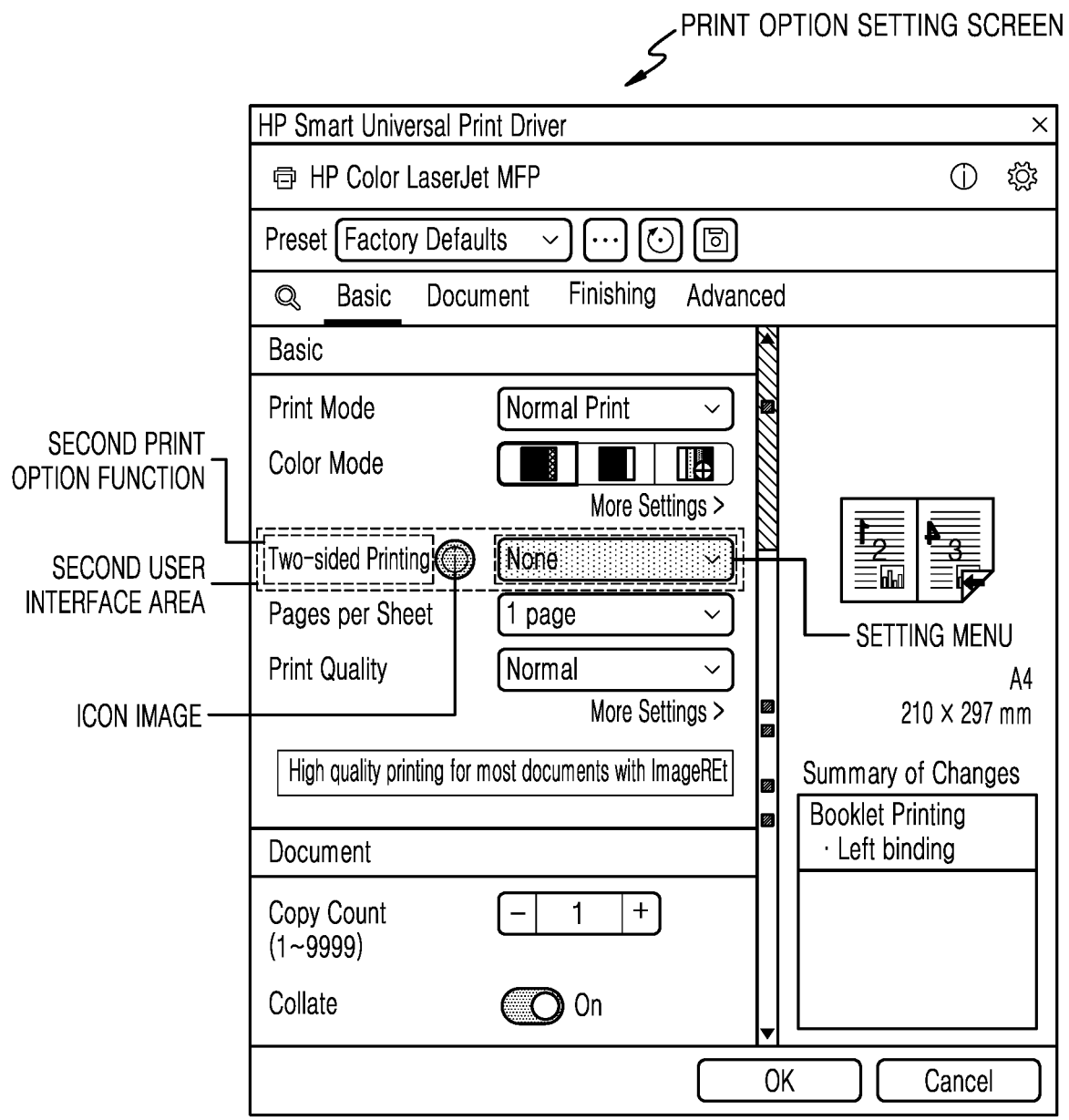
FIGS. 4 to 6 are diagrams illustrating a change in a print option setting screen that provides a second user interface area for setting a second print option function according to the setting of a first print option function according to various examples.
Figure 5:
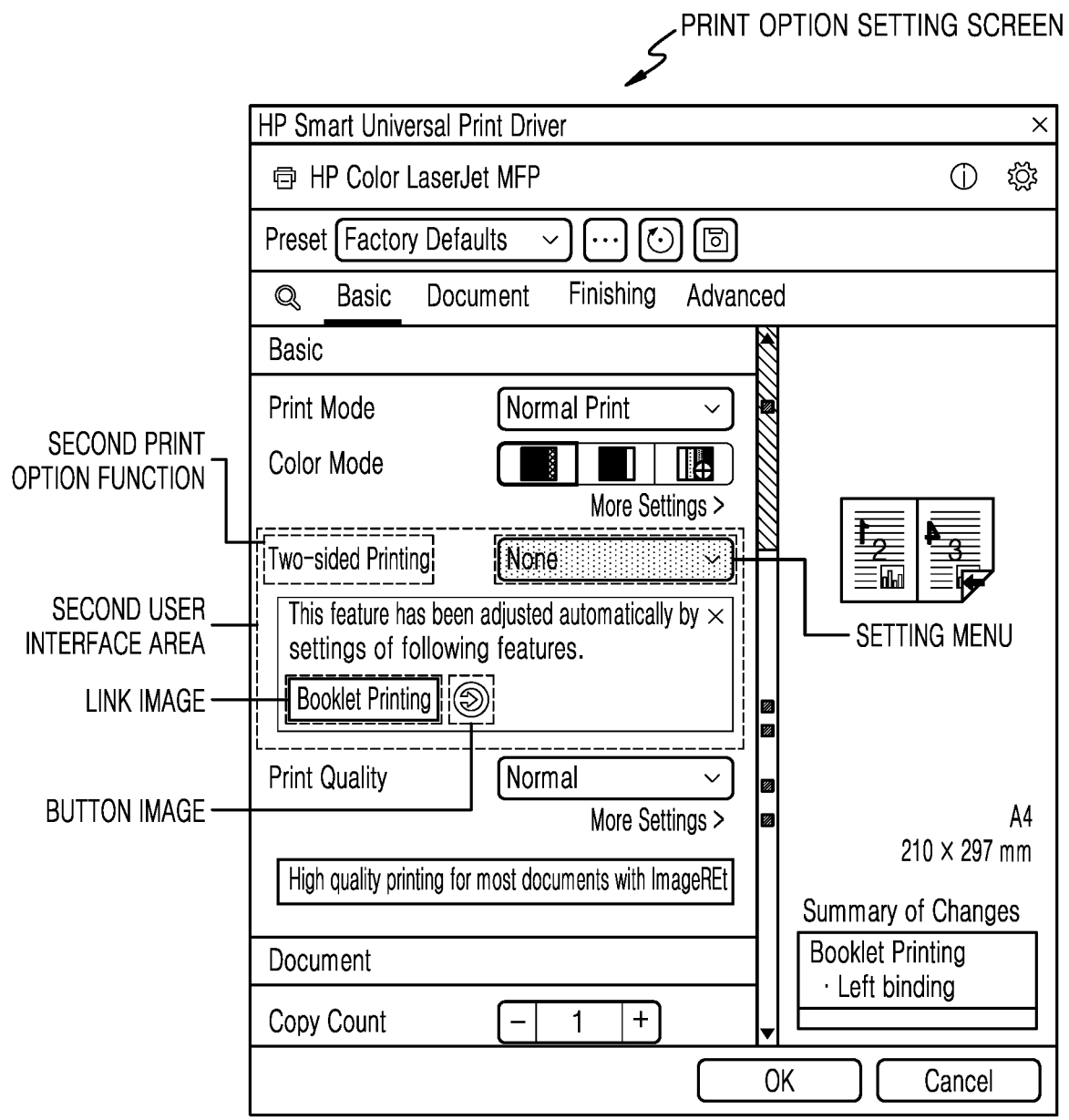
Figure 6:
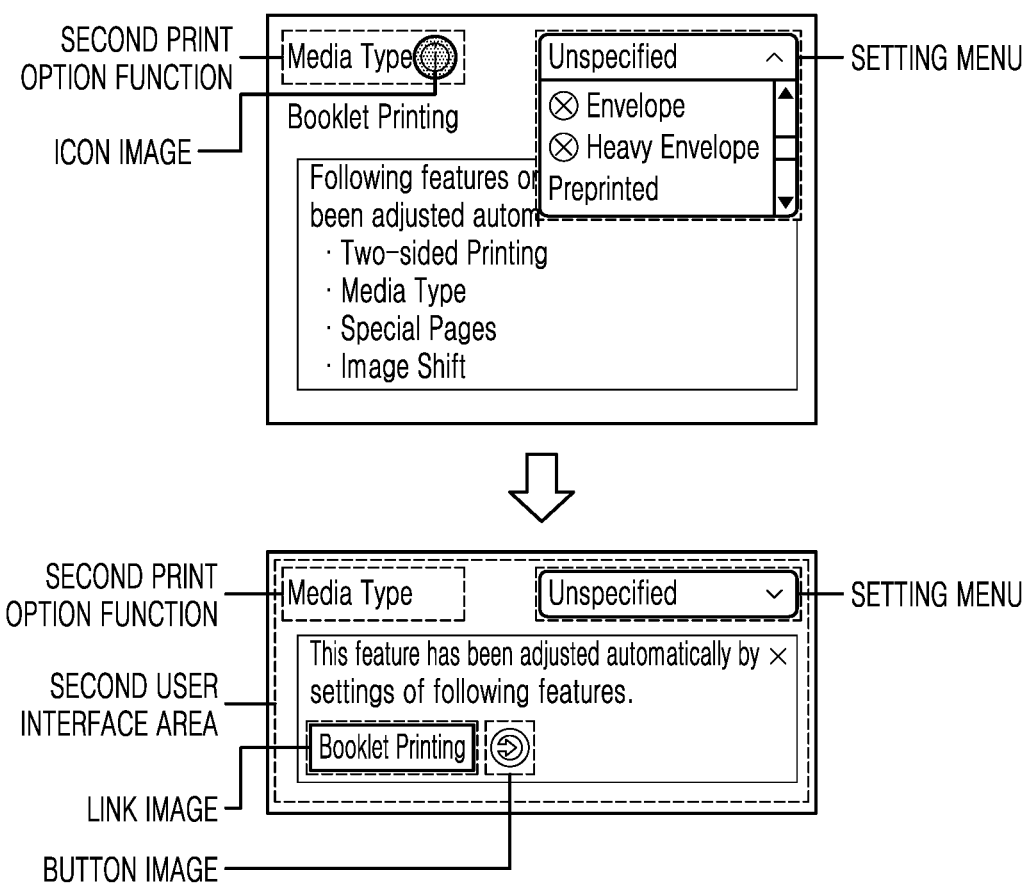

FIGS. 4 to 6 are diagrams illustrating a change in a print option setting screen that provides a second user interface area for setting a second print option function according to the setting of a first print option function according to various examples.

In FIG. 3, it has been described that 'Two-sided printing', 'Media Type', 'Special Page', and 'Image Shift' are the second print option functions that are in the constraint relationship with 'Booklet Printing', which is the first print option function. For convenience of description, in FIGS. 4 to 6, a print option setting screen that provides a user interface area for setting 'Two-sided Printing' or 'Media Type' among the second print option functions is illustrated.

Referring to FIGS. 4 and 5, for example, when the second print option function is 'Two-sided Printing', a change in the print option setting screen that provides a user interface area for setting 'Two-sided Printing' is illustrated. In FIG. 4, a print option setting screen before the selection of an icon image (e.g., a fifth user interface) provided in a user interface area for setting 'Two-sided Printing' is illustrated, and in FIG. 5, a print option setting screen after the selection of the corresponding icon image (e.g., fifth user interface) is illustrated.

In FIG. 4, as a result of selecting 'Left binding' as a setting value for 'Booklet printing' in FIG. 3, it is noticeable that a setting menu of the user interface area for setting 'Two-sided Printing' is deactivated so that no value may be selected. That is, according to the setting of 'Booklet Printing', the setting of 'Two-sided Printing' is constrained. When an icon image is provided in a user interface area for setting 'Two-sided Printing', and there is a user input to the icon image, a user interface area for setting 'Two-sided Printing' is expanded, and thus, a print option setting screen shown in FIG. 5 may appear.

Moreover, the provision of the icon image may set whether to use the corresponding function in a system setting menu. When the provision of the icon image is set not to be used, the print option setting screen shown in FIG. 5 may immediately appear.

In FIG. 5, a print option setting screen that displays a link image corresponding to an operation of displaying a user interface area for setting 'Booklet Printing' and a button image corresponding to an operation of changing the setting of 'Booklet Printing' to a preset value is shown in the user interface area for setting 'Two-sided Printing'. In response to a user input to the icon image provided in the user interface area for setting 'Two-sided Printing', the link image and button image may be displayed in the user interface area for setting 'Two-sided Printing' of the print option setting screen.

In the example of FIG. 5, an icon image displayed in the user interface area for setting 'Two-sided Printing' disappears, and the user interface area for setting 'Two-sided Printing' is expanded. Because the print option function that causes the constraint of 'Two-sided Printing' is 'Booklet Printing', a link image and a button image corresponding to 'Booklet Printing' may be displayed in a user interface area for setting 'Two-sided Printing'. Unlike the example of FIG. 5, when there are a plurality of print option functions that cause the constraint of 'Two-sided Printing', a link image and a button image corresponding to the plurality of print option functions, respectively, may be displayed in a user interface area for setting 'Two-sided Printing'.

Referring to FIG. 6, considering a 'Media Type', which is the other second print option function as an example, a change in a print option setting screen including a user interface area for setting 'Media Type' is illustrated. In FIG. 6, a user interface area for setting 'Media Type' before and after a user input to an icon image provided in a user interface area for setting 'Media Type' is shown.

Referring to FIG. 6, as a result of setting 'Left binding' as the setting value for 'Booklet Printing' in FIG. 3, it is noticeable that the setting menu for 'Media Type' is deactivated so that some values of the setting menu of the user interface area for setting the 'Media Type' may not be selectable. That is, according to the setting of 'Booklet Printing', the setting of 'Envelope' and 'Heavy Envelope' among the setting values of 'Media Type' is constrained. When an icon image is provided in a user interface area for setting 'Media Type', and there is a user input to the icon image, a user interface area for setting the 'Media Type' may be expanded.

In the user interface area for setting the expanded 'Media Type', a link image for switching to a user interface area for setting 'Booklet Printing' and a button image for changing 'Booklet Printing' to a preset value may be provided. In response to a user input to the icon image displayed in the user interface area for setting 'Media Type', the link image and the button image may be displayed in the user interface area for setting 'Media Type' of the print option setting screen. Because the print option function that causes the constraint of the 'Media Type' is 'Booklet Printing', the link image and the button image corresponding to 'Booklet Printing' may be provided in a user interface area for setting 'Media Type'. Unlike the example of FIG. 6, when there are a plurality of print option functions that cause the constraint of the 'Media Type', a link image and a button image corresponding to the plurality of print option functions, respectively, may be provided in the user interface area for setting 'Media Type'.

Figure 7:
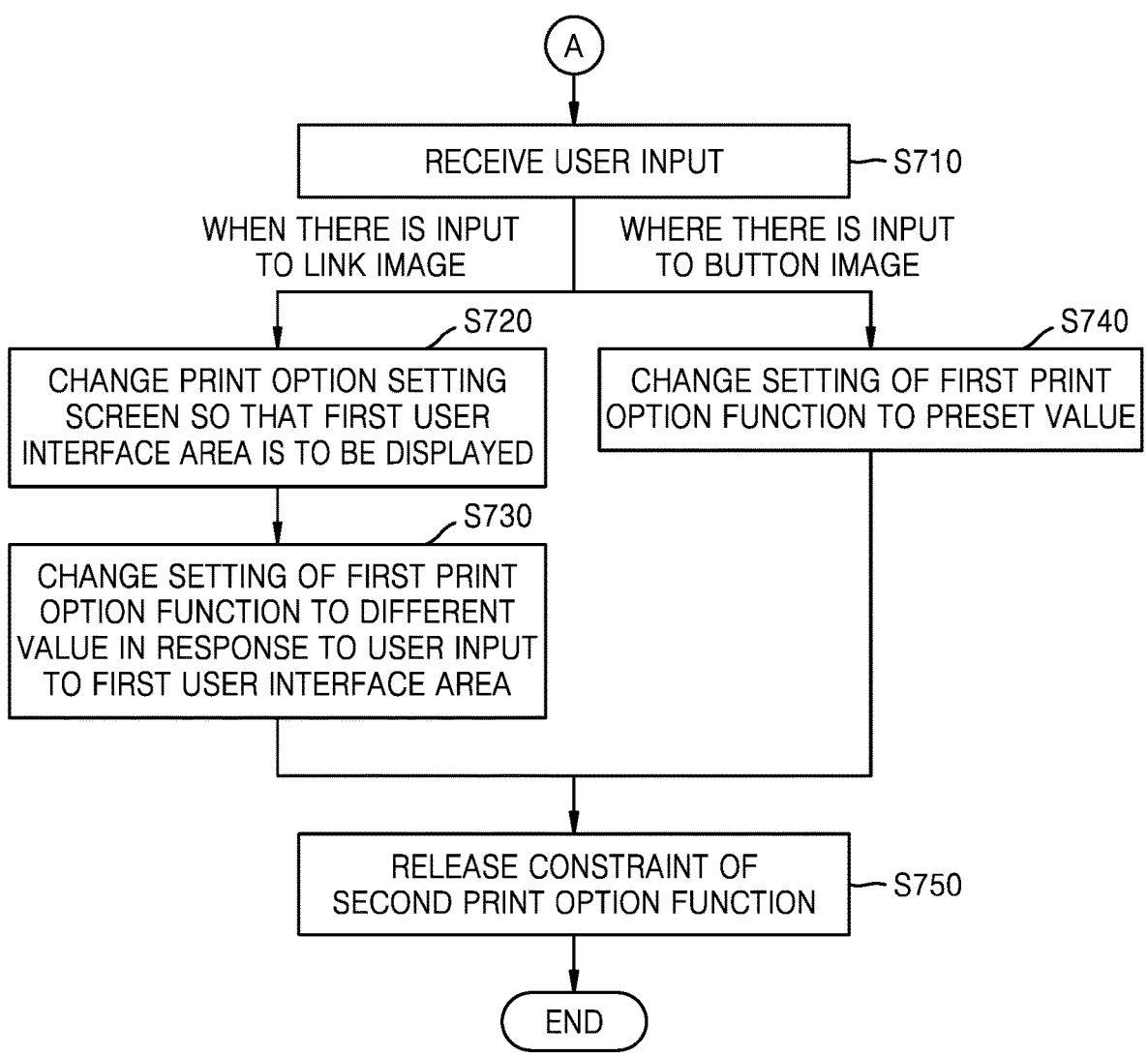
FIG. 7 is a flowchart illustrating a process of releasing a constrained print option function according to an example.

FIG. 7 is a flowchart illustrating a process of releasing a constrained print option function according to an example.

Referring to FIG. 7, the host device 100 may receive a user input to a print option setting screen displayed through the user interface unit 110 in operation S710. The print option setting screen may include a link image corresponding to an operation of displaying a first user interface area in a second user interface area and a button image corresponding to an operation of changing a setting of a first print option function to a preset value. Depending on whether the user input to the print option setting screen is an input to a link image or a button image, a process of releasing the constraint of the second print option function may differ.

When the user input is an input to the link image, the host device 100 may change the print option setting screen so that the first user interface area is to be displayed in operation S720. Even if the user does not know a position of the first user interface area on the print option setting screen, the print option setting screen may be changed to provide the first user interface area according to the user input to the link image. For example, the existing print option setting screen may be changed to cause the first user interface area to be displayed, or a new print option setting screen in the form of a pop-up window may be displayed to overlap or to be in parallel to the existing print option setting screen.

The host device 100 may change the setting of the first print option function to a different value in response to a user input to the first user interface area on the changed print option setting screen in operation S730. The user may set a value of the first print option function that constrains the second print option function in the first user interface area to the other value.

When the user input is an input to the button image, the host device 100 may change the setting of the first print option function to a preset value in operation S740. Without a user's manual input to the first user interface area, the setting of the first print option function may be automatically changed to a preset value according to a user input to the button image.

The host device 100 may release the constraint of the second print option function by changing a setting value of the first print option function that constrains the second print option function to the other value or to a preset value in operation S750. When there is one print option function that causes the constraint of the second print option function, the constraint of the second print option function may be immediately released. When there are a plurality of print option functions that cause the constraint of the second print option function, the setting values of all of the plurality of print option functions may be changed to different values or preset values, and the constraint of the second print option function may be released.

Figure 8A:
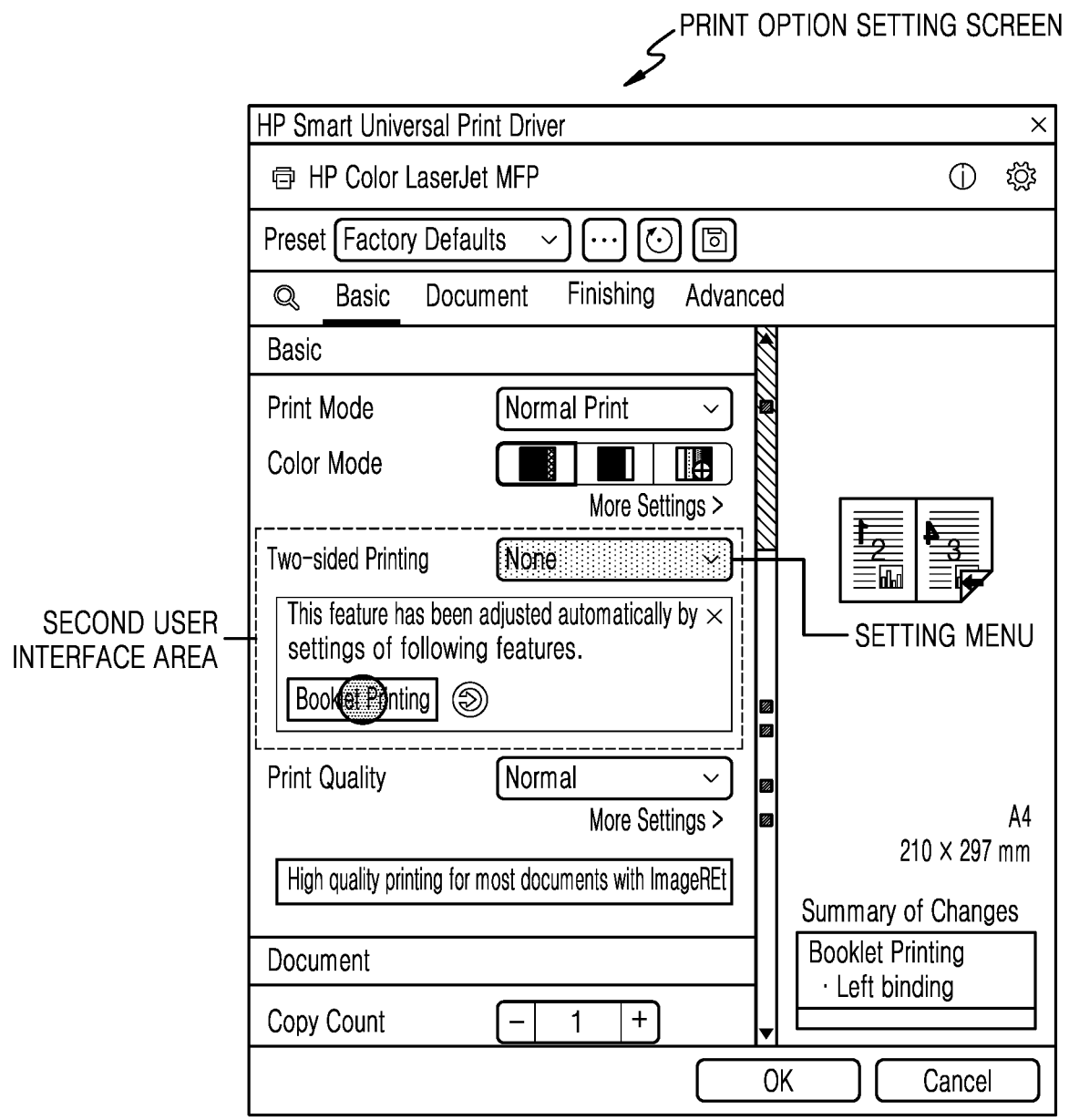
FIGS. 8A and 8B are diagrams illustrating a process of releasing a constraint of a second print option function using a link image provided in a second user interface area for setting the second print option function according to an example.
Figure 8B:
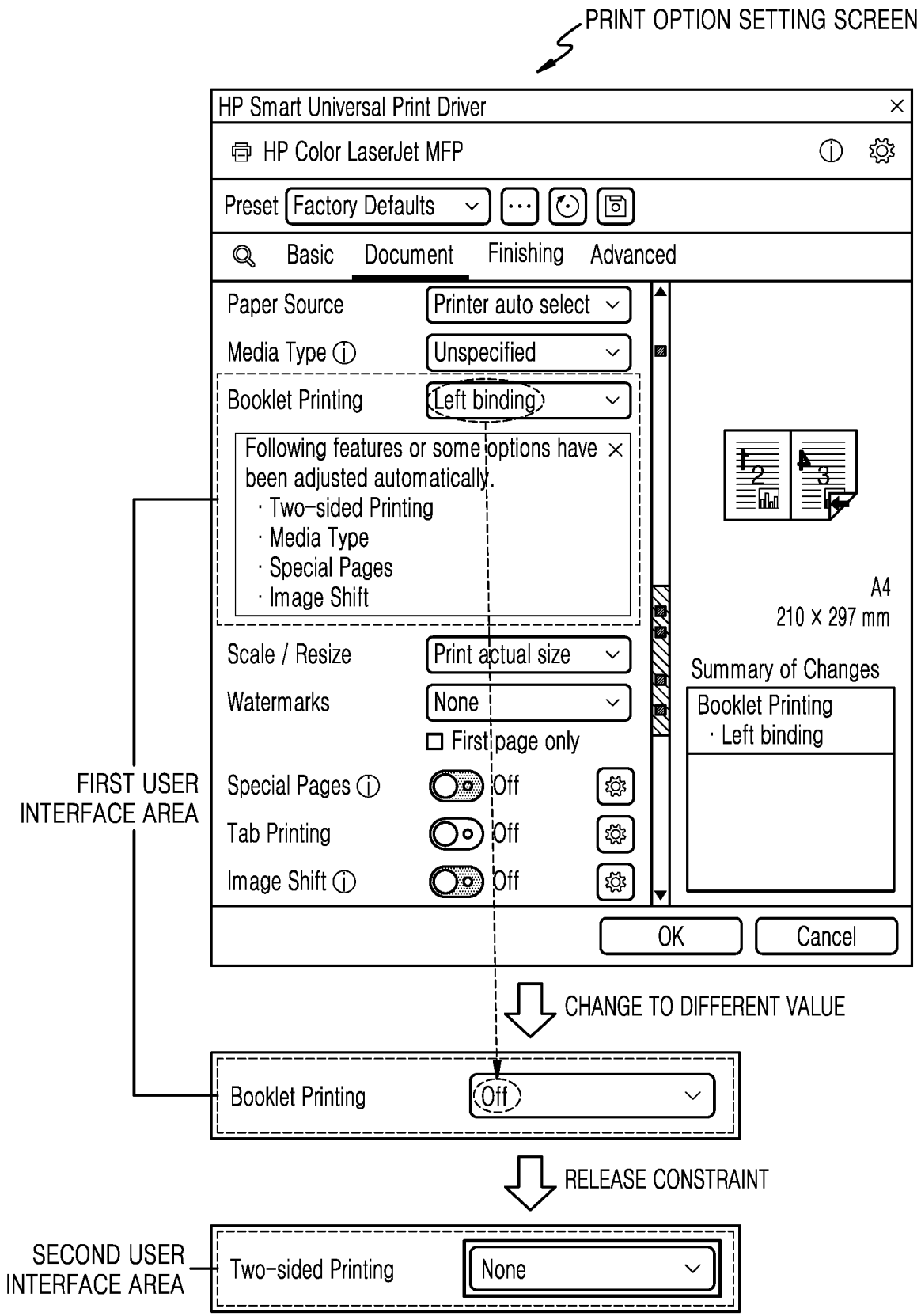

FIGS. 8A and 8B are diagrams illustrating a process of releasing a constraint of a second print option function using a link image provided in a second user interface area for setting the second print option function according to an example.

Referring to FIGS. 8A and 8B, for example, when the second print option function is 'Two-sided Printing', a process of releasing the constraint of 'Two-sided Printing' by using a link image displayed in the user interface area for setting 'Two-sided Printing' and switching the current user interface area on the print option setting screen to the interface area for setting 'Booklet Printing' is illustrated.

FIG. 8A illustrates the same print option setting screen as illustrated in FIG. 5 described above. It is necessary for the user to change the setting of 'Booklet Printing', which causes the constraint of 'Two-sided Printing', to the other value to release the constraint of 'Two-sided Printing'. To this end, the user may select a link image provided in the user interface area for setting 'Two-sided Printing'. When there is a user input to the link image on the print option setting screen displayed through the user interface unit 110, the host device 100 may change the print option setting screen so that the user interface area for setting 'Booklet Printing' is displayed.

FIG. 8B illustrates a print option setting screen including a user interface area for setting 'Booklet Printing'. The user may set, in the user interface area for setting 'Booklet Printing', 'Left binding' which is a value for the setting of 'Booklet Printing' which causes the constraint of 'Two-sided Printing', to the other value 'Off' that does not cause the constraint. The host device 100 may change 'Left binding', which is a previously set value, to the other value 'Off' in response to a user input to a user interface area for setting 'Booklet Printing' on the changed print option setting screen. As a result, the constraint on the setting menu that has been deactivated to prevent the selection of the setting menu in the user interface area for setting 'Two-sided Printing' is released, and thus, the user may select a value for the setting of 'Two-sided Printing' from the setting menu. The link image and the button image corresponding to the 'Booklet Printing' displayed in the user interface area for setting 'Two-sided Printing' may disappear.

Figure 9A:
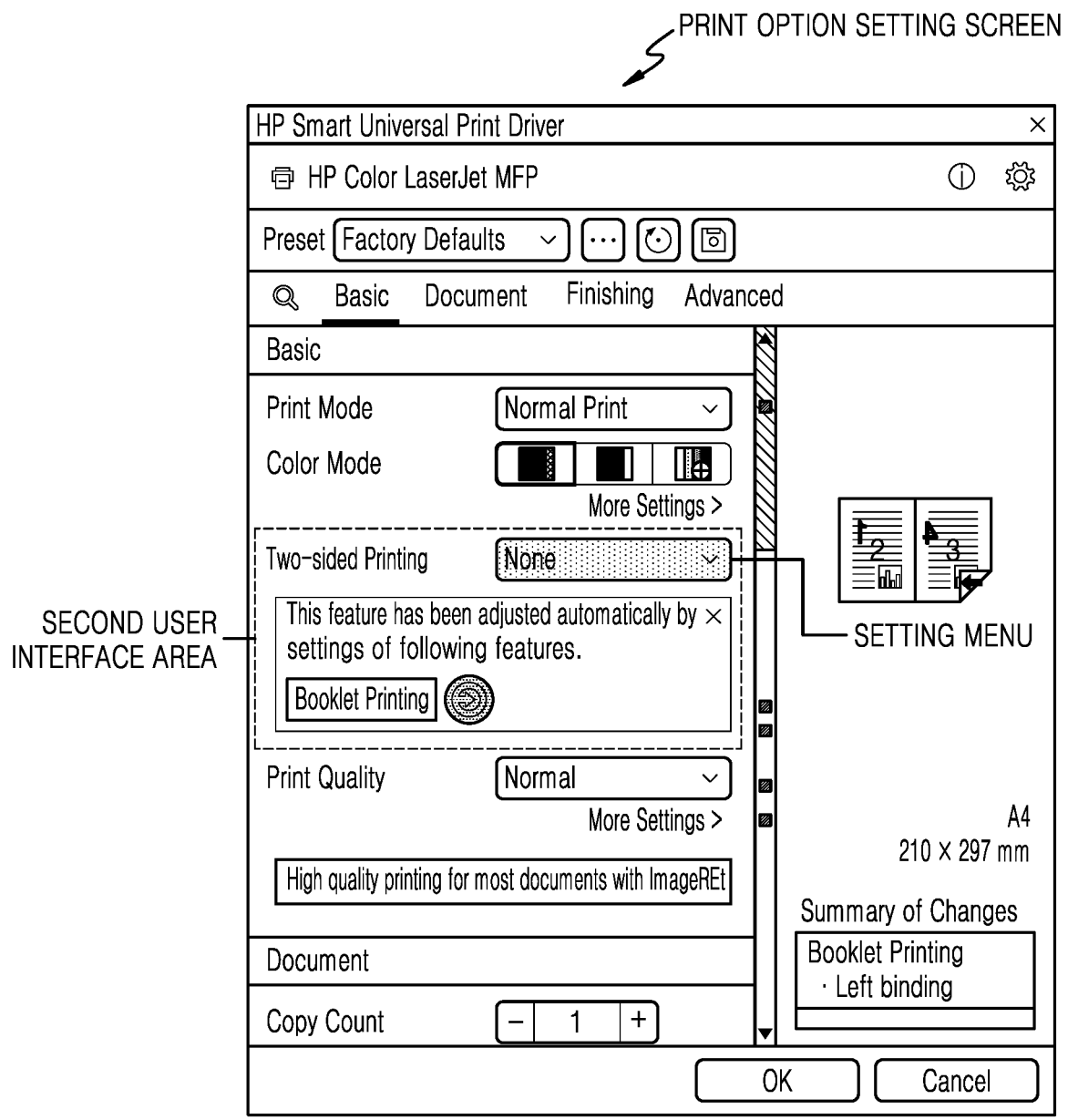
FIGS. 9A and 9B are diagrams illustrating a process of releasing a constraint of a second print option function using a button image provided in a second interface area for setting the second print option function according to an example.
Figure 9B:
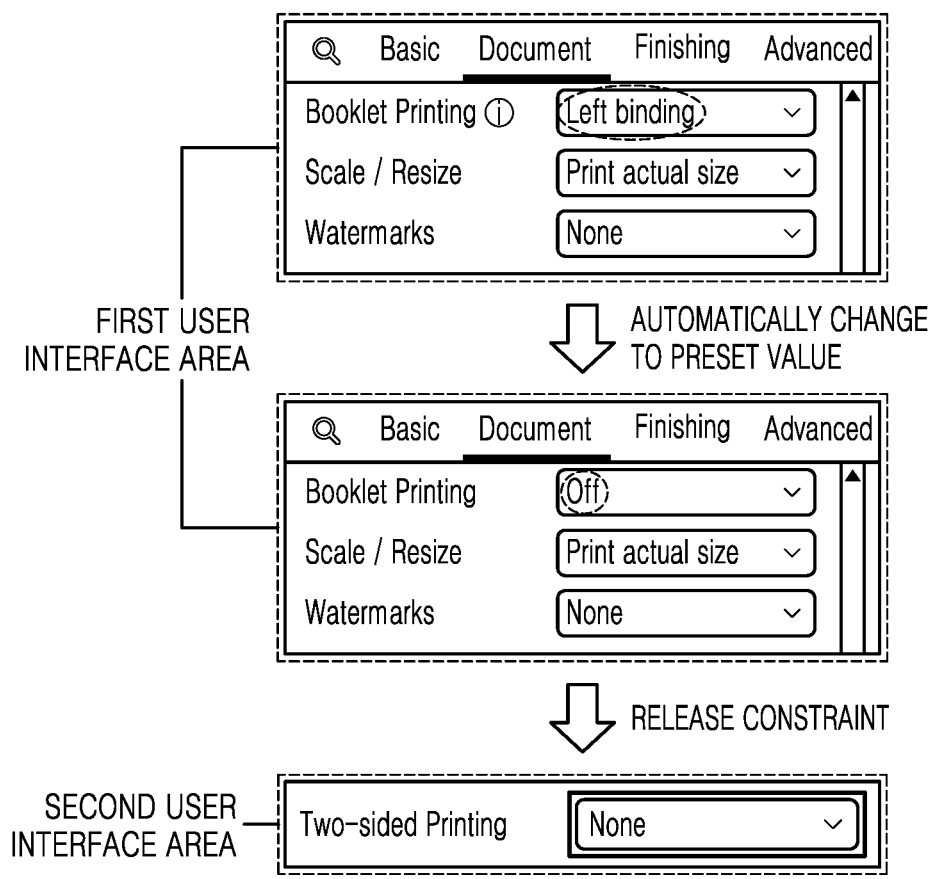

FIGS. 9A and 9B are diagrams illustrating a process of releasing a constraint of a second print option function using a button image provided in a second user interface area for setting the second print option function according to an example.

Referring to FIGS. 9A and 9B, for example, when the second print option function is 'Two-sided Printing', a process of releasing the constraint of 'Two-sided Printing' using a button image which changes the setting of 'Booklet Printing' provided in the user interface area for setting 'Two-sided Printing' to a preset value is illustrated.

FIG. 9A illustrates the same print option setting screen as illustrated in FIG. 5 described above. The user may change the setting of 'Booklet Printing', which causes the constraint of 'Two-sided Printing', to a preset value to release the constraint of 'Two-sided Printing'. To this end, the user may select the button image provided in the user interface area for setting 'Two-sided Printing', instead of accessing the user interface area for setting 'Booklet Printing'. When there is a user input to the button image in the print option setting screen displayed through the user interface unit 110, the host device 100 may automatically change a setting value for 'Booklet Printing' to a preset value.

FIG. 9B illustrates a process of automatically changing the setting value for 'Booklet Printing' to a preset value. The host device 100 may automatically change 'Left binding', which is the setting value for 'Booklet Printing', to 'Off', which is a preset value. In FIG. 9B, for convenience of explanation, a process in which a value of the setting menu of 'Booklet Printing' is automatically changed to 'Off', which is a preset value, in the user interface area for setting 'Booklet Printing' is illustrated. Such an operation may not be displayed through the user interface unit 110, but may be executed in the background. As a result, the constraint on the setting menu that has been deactivated to prevent the selection of the value of the setting menu in the user interface area for setting the 'Two-sided Printing' is released so that the user may select a value for the setting of the Two-sided Printing in the setting menu. The link image and the button image corresponding to the 'Booklet Printing' displayed in the user interface area for setting 'Two-sided Printing' may disappear.

Figure 10:
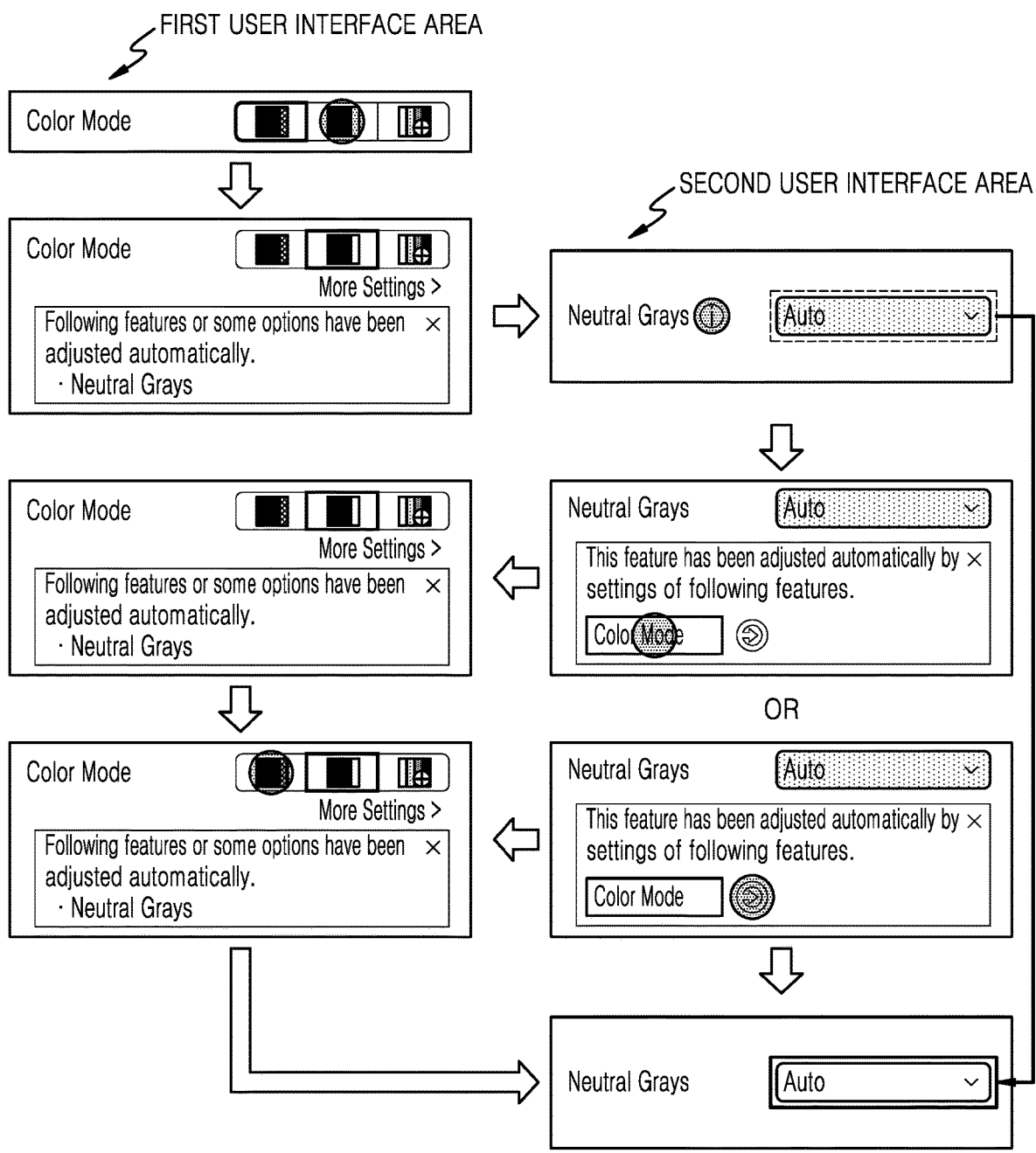
FIG. 10 is a diagram illustrating a method of processing a constrained print option function in which a first print option function is 'Color Mode' and a second print option function is 'Neutral Grays' according to an example.

FIG. 10 is a diagram illustrating a method of processing a constrained print option function in which a first print option function is 'Color Mode' and a second print option function is 'Neutral Grays' according to an example. In the example of FIG. 10, 'Booklet Printing' and 'Two-sided Printing', 'Media Type', 'Special Page', and 'Image Shift', which are print option functions constrained according to the setting of 'Booklet Printing' described above, are an example of a one-to-many constraint relationship. On the other hand, 'Color Mode' and 'Neutral Grays' shown in FIG. 10 correspond to an example of a one-to-one constraint relationship. In FIG. 10, a change in a user interface area for setting 'Neutral Grays' constrained according to the setting of 'Color Mode' is shown, and a process of releasing the constraint of 'Neutral Grays' using a link image or a button image corresponding to 'Color Mode' displayed in the user interface area for setting the 'Neutral Grays' is shown.

Referring to FIG. 10, when a value for a setting menu of the user interface area for setting 'Color Mode', is set to 'grayscale', a setting menu of a user interface area for setting 'Neutral Grays' is set to 'Auto', which is a particular value. Also, the user interface area for setting 'Neutral Grays' is deactivated and constrained to prevent the selection of another value. When there is a user input to an icon image provided in a user interface area for setting 'Neutral Grays', the host device 100 may display, in the user interface area for setting 'Neutral Grays', through the user interface unit 110, a print option setting screen for displaying a link image for switching to a user interface area for setting 'Color Mode' and a button image for changing the setting of 'Color Mode' to a preset value. Because a print option function that causes the constraint of 'Neutral Grays' is 'Color Mode', a link image and a button image corresponding to 'Color Mode' may be provided in the user interface area for setting 'Neutral Grays'.

When there is a user input to a link image corresponding to 'Color Mode' on the print option setting screen displayed through the user interface unit 110, the host device 100 may change the print option setting screen so that the user interface area for setting the 'Color Mode' is to be displayed. In the user interface area for setting 'Color Mode', the user may set 'grayscale', which is a setting value of 'Color Mode' that causes the constraint of 'Neutral Grays' to the other value of 'color' which does not cause any constraint. The host device 100 may change the 'grayscale', which is a previously set value, to the other value of 'color' in response to a user input to a user interface area for setting 'Color Mode' on the changed print option setting screen. As a result, the constraint on the setting menu that has been deactivated to prevent the selection of a value of a setting menu in the user interface area for setting 'Neutral Grays' is released, and thus, the user may select a value for the setting of 'Neutral Grays' from the setting menu.

When there is a user input to a button image corresponding to 'Color Mode' in the print option setting screen displayed through the user interface unit 110, the host device 100 may automatically change a setting value for the 'Color Mode' to a preset value. The host device 100 may automatically change 'grayscale', which is a setting value for 'COLOR MODE', to 'color', which is a preset value. As a result, the constraint on the setting menu that has been deactivated to prevent the selection of a value of the setting menu in the user interface area is released, and thus, the user may select a value for the setting of 'Neutral Grays' from the setting menu.

By changing the setting value for 'Color Mode' to a setting value different from the setting value that causes the constraint on the 'Neutral Grays', or by automatically changing the setting value for the 'Color Mode' to a preset value, the constraint on the 'Neutral Grays' may be released. In addition, the link image and button image corresponding to 'Color Mode' displayed in the user interface area for setting 'Neutral Grays' may disappear.

Figure 11:
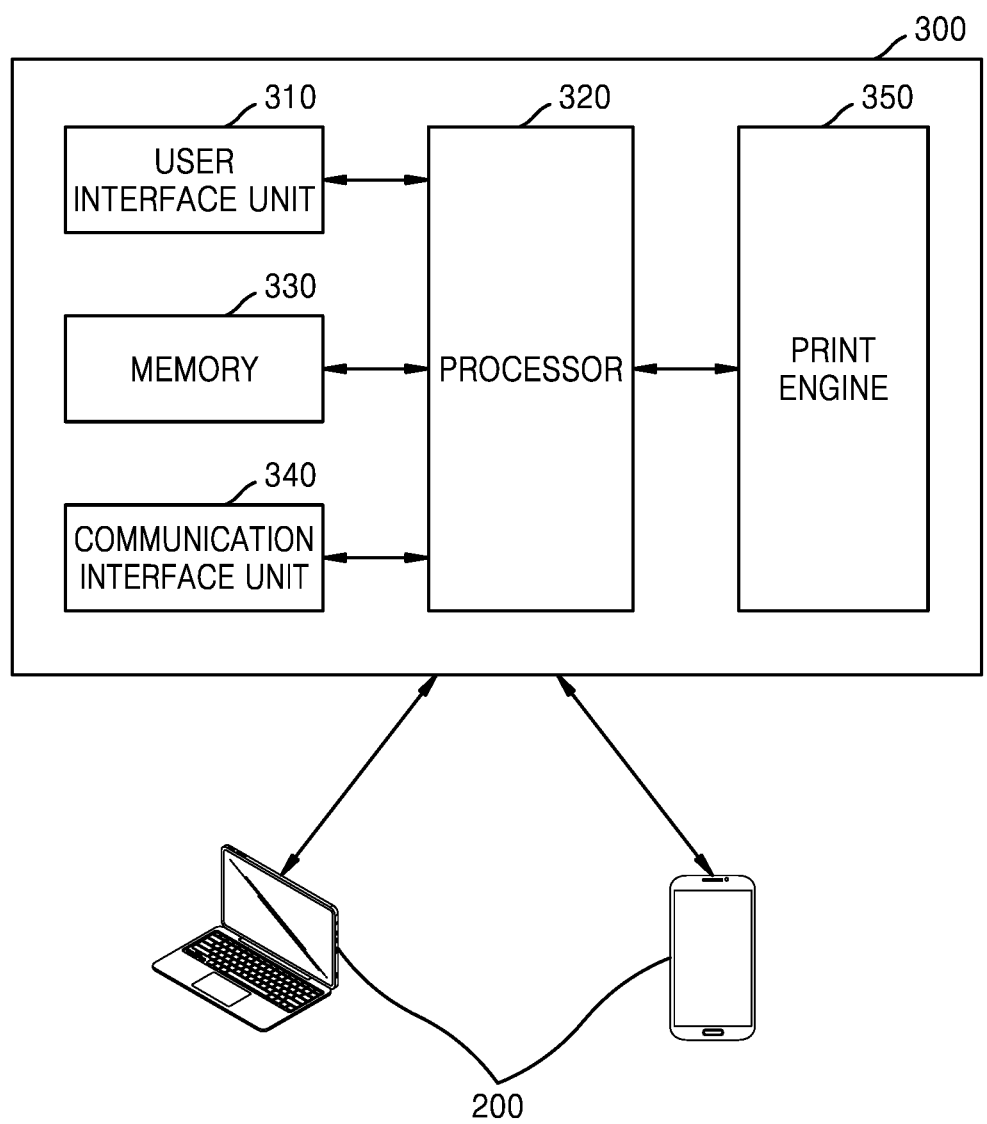
FIG. 11 is a diagram illustrating an image forming apparatus according to an example.

FIG. 11 is a diagram illustrating an image forming apparatus according to an example.

The image forming apparatus 300 collectively refers to a device capable of performing an image forming job, such as a printer, a copier, a scanner, a facsimile, a multifunction machine, and the like. The image forming job may refer to a job related to an image, for example, printing, copying, scanning, faxing, or a function associated therewith, and may refer to a series of processes required to perform the image forming job.

Referring to FIG. 11, the image forming apparatus 300 may include a user interface unit 310, a processor 320, a memory 330, a communication interface unit 340, and a print engine 350. A user may set a print option function on the print option setting screen displayed on the user interface unit 310 of the image forming apparatus 300, and thus, the description of the host device 100 described above may be applied as it is or may be appropriately modified and applied to the description of the image forming apparatus 300. Therefore, the description of the user interface unit 110, the processor 120, and the memory 130 of the host device 100 described above may be applied as it is or may be appropriately modified and applied to the description of the user interface unit 310, the processor 320, and the memory 330 of the image forming apparatus 300, and thus, further descriptions thereof will be omitted. The image forming apparatus 300 may further include a communication interface unit 340 and a print engine 350. In addition, although not shown, the image forming apparatus 300 may further include a power supply unit for supplying power to each component.

The communication interface unit 340 may perform wired/wireless communication with the other device or a network. To this end, the communication interface unit 340 may include a communication module (e.g., transceiver) which supports at least one of various wired and wireless communication methods. The image forming apparatus 300 may be connected to an external server, a user terminal 200, or external devices provided therearound through the communication interface unit 340. For example, the image forming apparatus 300 may install and execute an application type program received from an external server through the communication interface unit 340 in the image forming apparatus 300. The user terminal 200 may be a smartphone, a tablet PC a laptop, and the like. The user terminal 200 may communicate with the image forming apparatus 300 or the other external server.

The print engine 350 may include both hardware and software capable of performing an image forming job such as printing, copying, scanning, and faxing, and may include modules such as a print unit, a scan unit, and a fax unit. The print unit may form an image on a recording medium by various print methods such as an electrophotographic method, an inkjet method, a thermal transfer method, a thermosensitive method, and the like. The scan unit may emit a light to a manuscript and receive a light reflected from the manuscript to read an image recorded on the manuscript. For the fax unit, the configuration for scanning an image may be shared with the scan unit, and the configuration for printing a received file may be shared with the print unit. The fax unit may transmit a scan file to a destination or receive a file from the outside.

Moreover, the above-described method of processing a constrained print option function may be implemented in the form of a non-transitory computer-readable storage medium storing instructions executable by the processor. The computer is a device capable of calling stored instructions from a storage medium and performing an operation according to an example in accordance with the called instructions, and may include the host device 100 or the image forming apparatus 300 according to the examples. The non-transitory computer-readable storage medium may be read-only memory (ROM), random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tape, a floppy disk, a magneto-optical data storage device, an optical data storage device, a hard disk, a solid-state disk (SSD), and any device capable of storing instructions or software, related data, a data file, and any data structures and any device capable of providing instructions or software, related data, a data file, and data structures to a program or a computer to enable the processor or the computer to execute the instructions.

Also, a method according to the above examples may be provided in the form of a computer program. The computer program may include an application in the form of a software program that is electronically distributed through a manufacturer of the image forming apparatus 300 or a server of a third party, or an online content marketplace such as an application store. In addition, the computer program may be stored in a storage medium of the server or a storage medium of the host device 100 or the image forming apparatus 300, and the method according to the examples may be implemented as the server or the host device 100 or the image forming apparatus 300 executes the computer program.

What is claimed is:

1. A host device comprising:
a user interface unit;
a memory to store one or more instructions; and
a processor to, by executing the one or more instructions:
    display a print option setting screen on the user interface unit, the print option setting screen including a second user interface area for setting a second print option function, the second print option function being constrained from use based on the second print option function being incompatible with a setting of a first print option function; and
    display a first user interface element and a second user interface element in the second user interface area, the first user interface element corresponding to an operation of displaying a first user interface area for setting the first print option function and the second user interface element corresponding to an operation of changing the setting of the first print option function to a preset value.

2. The device of claim 1, wherein the processor is to, in a case where a setting of a third print option function constrains the second print option function based on the second print option function being incompatible with the setting of the third print option function, display a third user interface element and a fourth user interface element in the second user interface area, the third user interface element corresponding to an operation of displaying a third user interface for setting the third print option function and the fourth user interface element corresponding to an operation of changing the setting of the third print option function to a preset value.

3. The device of claim 1, wherein the processor is to display the first user interface area in response to a user input to the first user interface element.

4. The device of claim 3, wherein the processor is to change the setting of the first print option function in response to a user input to the first user interface area to release the constraint on the second print option function.

5. The device of claim 1, wherein the processor is to change the setting of the first print option function to the preset value in response to a user input to the second user interface element to release the constraint on the second print option function.

6. The device of claim 1, wherein the first user interface element and the second user interface element are displayed in the second user interface area in response to a user input to a fifth user interface element displayed in the second user interface area.

7. The device of claim 1, wherein the first user interface element is displayed so that a name of the first print option function appears.

8. The device of claim 1, wherein the print option setting screen further comprises a scroll bar including indicators which indicate positions of the first user interface area and the second user interface area on the print option setting screen, and
    wherein the processor is to change the print option setting screen so that a user interface area for setting a print option function corresponding to an arbitrary indicator is to be displayed in response to a user input to the arbitrary indicator of the scroll bar.

9. A method of processing a constrained print option function, the method comprising:
    setting a first print option function on a print option setting screen; and
    displaying a first user interface element and a second user interface element in a second user interface area for setting a second print option function, the second print option function being constrained from use based on the second print option function being incompatible with the setting of the first print option function, the first user interface element corresponding to an operation of displaying a first user interface area for setting the first print option function and the second user interface element corresponding to an operation of changing the setting of the first print option function to a preset value.

10. The method of claim 9, further comprising, in a case where a setting of a third print option function constrains the second print option function based on the second print option function being incompatible with the setting of the third print option function, displaying a third user interface element and a fourth user interface element in the second user interface area, the third user interface element corresponding to an operation of displaying a third user interface area for setting the third print option function and the fourth user interface element corresponding to an operation of changing the setting of the third print option function to a preset value.

11. The method of claim 9, further comprising displaying the first user interface area in response to a user input to the first user interface element.

12. The method of claim 11, further comprising changing the setting of the first print option function in response to a user input to the first user interface area to release the constraint of the second print option function.

13. The method of claim 9, further comprising changing the setting of the first print option function to the preset value in response to a user input to the second user interface element to release the constraint of the second print option function.

14. The method of claim 9, wherein the print option setting screen further comprises a scroll bar including indicators indicating positions of the first user interface area and the second user interface area on the print option setting screen, and wherein the method further comprises changing the print option setting screen so that a user interface area for setting a print option function corresponding to an arbitrary indicator is to be displayed in response to a user input to the arbitrary indicator of the scroll bar.

15. A non-transitory computer-readable storage medium storing instructions that are executable by a processor, the non-transitory computer-readable storage medium comprising:

instructions to set a first print option function on a print option setting screen; and instructions to display a first user interface element and a second user interface element in a second user interface area for setting a second print option function, the second print option function being constrained from use based on the second print option function being incompatible with the setting of the first print option function, the first user interface element corresponding to an operation of displaying a first user interface area for setting the first print option function and the second user interface element corresponding to an operation of changing the setting of the first print option function to a preset value.

* * * * *